No. 846,283. PATENTED MAR. 5, 1907.
C. L. COOK.
SHAFT PACKING.
APPLICATION FILED DEC. 8, 1906.
2 SHEETS—SHEET 1.
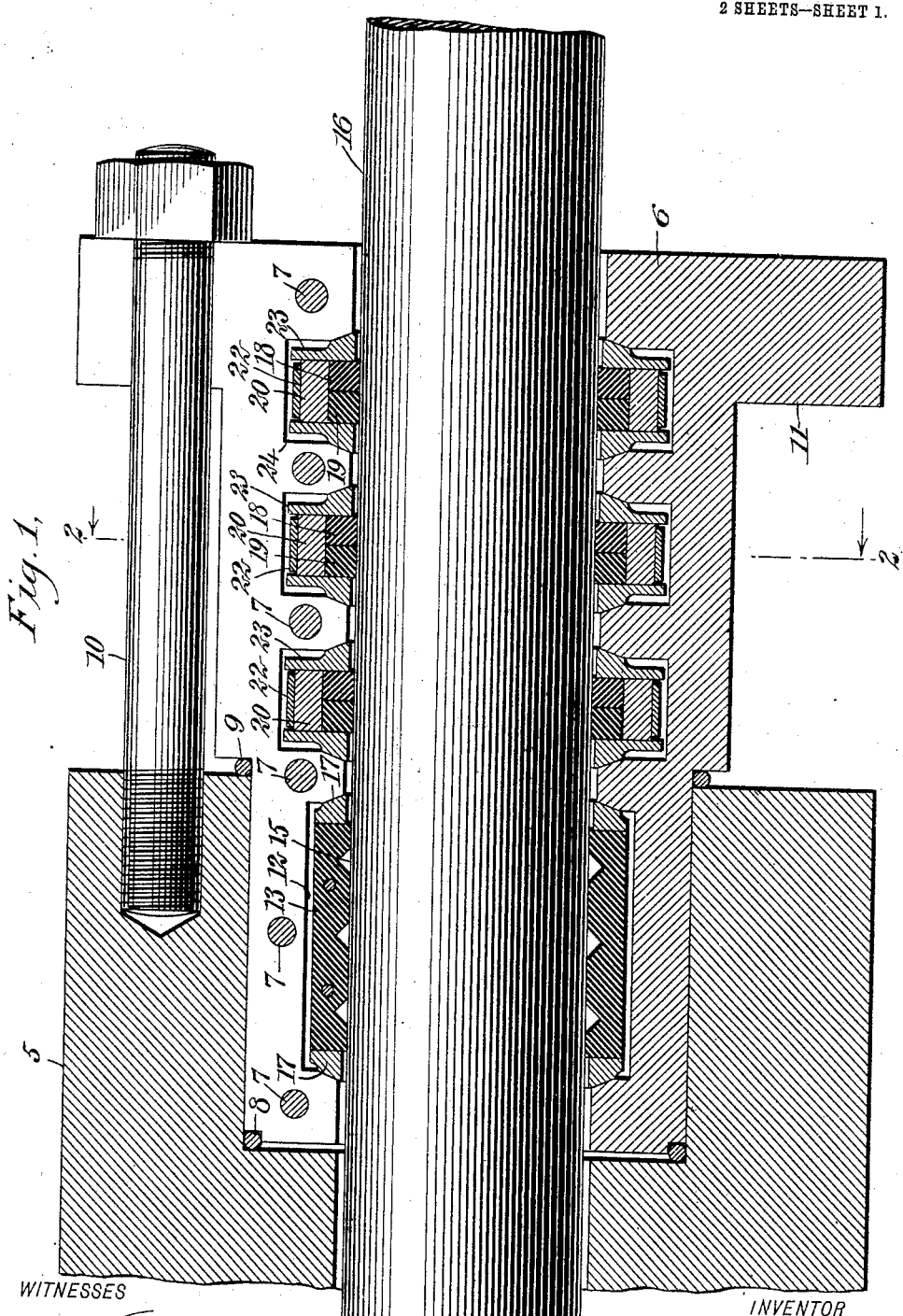
WITNESSES
Edward Thorpe
C. R. Ferguson
INVENTOR
Charles Lee Cook
BY Munn & Co
ATTORNEYS No. 846,283. PATENTED MAR. 5, 1907.
C. L. COOK.
SHAFT PACKING.
APPLICATION FILED DEC. 8, 1906.
2 SHEETS—SHEET 2.
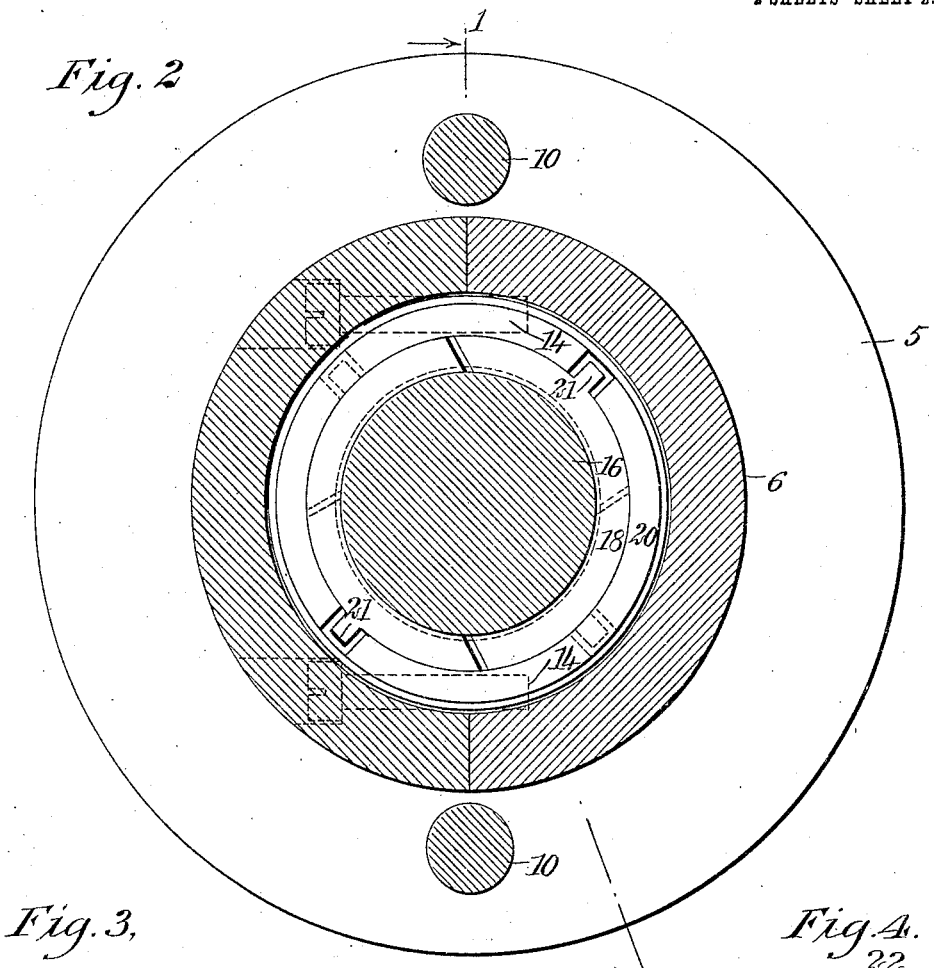
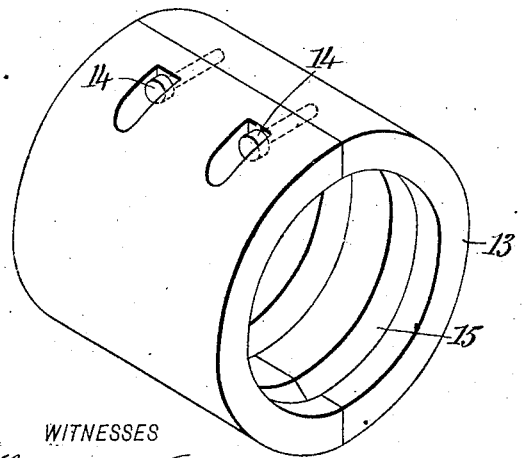
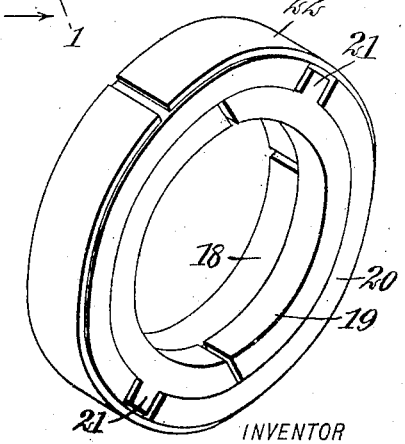
WITNESSES
Edward Thorpe,
C. R. Ferguson
INVENTOR
Charles Lee Cook
BY Munn & Co.
ATTORNEYS

UNITED STATES PATENT OFFICE.

CHARLES LEE COOK, OF LOUISVILLE, KENTUCKY.

SHAFT-PACKING.

No. 846,283.　　　　Specification of Letters Patent.　　Patented March 5, 1907.

Application filed December 8, 1906. Serial No. 346,877.

*To all whom it may concern:*

Be it known that I, CHARLES LEE COOK, a citizen of the United States, and a resident of Louisville, in the county of Jefferson and State of Kentucky, have invented a new and Improved Shaft-Packing, of which the following is a full, clear, and exact description.

This invention relates to improvements in packings particularly designed for automobile piston-shafts, an object being to provide a packing that will permit the slight vibratory motion incident to piston-shafts, but will effectually prevent leakage along the shaft of gas or other motive agent employed.

Other objects of the invention will appear in the general description.

I will describe a shaft-packing embodying my invention and then point out the novel features in the appended claims.

Reference is to be had to the accompanying drawings, forming a part of this specification, in which similar characters of reference indicate corresponding parts in all the figures.

Figure 1 is a longitudinal section of a shaft-packing embodying my invention, the section being on the line 1 1 of Fig. 2. Fig. 2 is a section on the line 2 2 of Fig. 1. Fig. 3 is a perspective view of a fire-ring employed, and Fig. 4 illustrates one of the packings.

Referring to the drawings, 5 designates a stuffing-box as usually employed on a motor-cylinder, and engaged in the stuffing-box is a packing-case 6, here shown as consisting of two sections secured together by bolts 7. Engaging between the inner end of the packing-case and the inner wall of the stuffing-box is a packing-ring 8, and a packing 9 engages between the outer end of the stuffing-box and an annular shoulder formed on the packing-case. These rings 8 and 9 preferably consist of annealed steel or iron wire, as any other material would not be practicable because of the corrosive influence of the hot gases. The packing-case is secured to the stuffing-box by means of bolts 10, which pass through an annular flange 11 on the outer end of the packing-case and engage in tapped holes in the end of the stuffing-box, as clearly illustrated in Fig. 1. The portion of the packing-case within the stuffing-box has an interior annular channel 12, which receives a fire-ring 13, consisting of suitable metal, the fire-ring being made in two sections, as shown in Fig. 3, the said sections being secured together by screws 14. The interior of said fire-ring is provided with annular channels 15 for receiving a lubricant. This ring is somewhat smaller in diameter than the interior diameter of the channel 12, so that the shaft 16 may have a slight vibratory movement; but as the fire-ring engages closely against the shaft leakage between the ring and shaft will be prevented, and this leakage is further prevented by means of ball-rings 17, which engage with the ends of the fire-ring and with the wall of the channel 12. The outer surfaces of the ball-rings are tapered and the walls of the channel 12 with which they engage are correspondingly shaped, so that there is a wedge-like connection between the parts.

I will now describe the packing-ring employed. In the drawing, Fig. 1, I have shown three sets of packing-rings; but it is obvious that the number may be changed without departing from the spirit of my invention. Each packing-ring consists of two sections 18 19, engaging closely with the shaft, and each section is formed of two segmental members, the joint of one section being broken from that of the other section, as shown in Fig. 4. Engaging around the packing-rings 18 19 is a sealing-ring 20, which also consists of two segmental members, and the packing-rings are provided with lugs 21 for engaging between the ends of the sealing-ring sections, so as to prevent any possible movement of the packing-ring sections with relation to the sealing-ring sections. The sealing-ring sections are held together by a spring-ring 22, which, as indicated in Fig. 4, is open at one side and surrounds the sections of the sealing-ring. The sides of the packing-rings, the sealing-ring, and the holding device 22 are engaged by ball-rings 23, and the several parts are arranged in an annular recess 24, formed in the interior of the packing-case.

Any suitable means may be employed for cooling the stuffing-box, the shaft, and its packing-rings.

Having thus described my invention, I claim as new and desire to secure by Letters Patent—

1. A shaft-packing comprising a packing-case, a pair of packing-rings arranged in the case for engaging with a shaft, each of said rings consisting of segmental sections, a sectional sealing-ring for engaging around the packing-rings, means for holding the sections of the sealing-ring in position, and ball-rings engaging with the packing-rings and the sealing-ring.

2. In a shaft-packing, a packing-case through which the shaft extends, the said packing-case having an interior annular channel, a pair of packing-rings arranged in the channel and adapted for engagement with the shaft, each ring consisting of segmental sections, a sealing-ring consisting of segmental sections engaging around the packing-rings, lugs on the outer sides of the packing-ring, sections for engaging between the ends of the sealing-ring sections, a spring-ring engaging around the sealing-ring sections, and ball-rings engaging the sides of the several rings and also engaging with the opposite walls of said channel.

3. The combination with a stuffing-box for a motor, of a packing-casing having an interior annular channel provided with inclined walls extended therein, packing-rings arranged between said casing and the stuffing-box, packing-rings arranged in the channel, and ball-rings between the packing-rings and the walls of the channels.

4. The combination with the stuffing-box for a motor-cylinder, of a packing-case secured to the stuffing-box and having a portion extended therein, the said portion within the stuffing-box having an annular channel, a fire-ring consisting of segmental sections arranged in said channel, the said ring having interior annular channels for lubricant, sectional ball-rings engaging with the ends of the fire-ring and with the walls of said channel, and packing-rings arranged in the casing outward of the stuffing-box.

In testimony whereof I have signed my name to this specification in the presence of two subscribing witnesses.

CHARLES LEE COOK.

Witnesses:
GRADDY CARY,
H. W. BATSON.